United States Patent [19]

Hinotani

[11] Patent Number: 5,172,367
[45] Date of Patent: Dec. 15, 1992

[54] OPTICAL PICKUP GUIDE RAIL POSITIONING MECHANISM

[75] Inventor: Hiroaki Hinotani, Kakuda, Japan

[73] Assignee: Alps Electric Co., Ltd., Tokyo, Japan

[21] Appl. No.: 669,253

[22] Filed: Mar. 14, 1991

[30] Foreign Application Priority Data

May 29, 1990 [JP] Japan ................................ 2-56072[U]

[51] Int. Cl.$^5$ ...................... G11B 17/00; G11B 17/30; G11B 21/16
[52] U.S. Cl. .................................. 369/215; 369/219; 369/244; 369/249; 360/104
[58] Field of Search ............... 369/215, 219, 244, 249, 369/258, 220, 251, 253; 360/99.02, 99.03, 104, 105

[56] References Cited

U.S. PATENT DOCUMENTS

| 4,415,941 | 11/1983 | Gibeau et al. | 360/78.12 |
| 4,698,798 | 10/1987 | Faber et al. | 369/219 |
| 4,999,725 | 3/1991 | Takahashi | 360/105 |

FOREIGN PATENT DOCUMENTS

| 60-205872 | 10/1985 | Japan | 369/215 |
| 61-66201 | 4/1986 | Japan | 369/215 |
| 63-152064 | 6/1988 | Japan | 369/215 |
| 1-59963 | 4/1989 | Japan . | |
| 1-113967 | 5/1989 | Japan | 369/215 |
| 1-166336 | 6/1989 | Japan | 369/215 |
| 2-64971 | 3/1990 | Japan | 369/215 |

Primary Examiner—John W. Shepperd
Assistant Examiner—Edward Sikorski
Attorney, Agent, or Firm—Guy W. Shoup; David W. Heid

[57] ABSTRACT

An optical pickup guide mechanism for guiding the optical pickup of an optical disk player is capable of correctly guiding the optical pickup regardless of the position of the optical pickup relative to the guide rails of the optical pickup guide mechanism. The optical pickup guide mechanism comprises a fixed guide rail, a movable guide rail, and a holding mechanism capable of holding the movable guide rail constantly in parallel to the fixed guide rail and of resiliently biasing the movable guide rail toward the fixed guide rail so that the movable guide rail can be translated. The movable rail is held always in parallel to the fixed guide rail regardless of the position of the optical pickup relative to the fixed guide rail and the movable guide rail and, consequently, the optical pickup can be guided for smooth movement radially to the center of the optical disk loaded on the optical disk player in a plane parallel to the optical disk, so that the optical pickup is able to function satisfactorily.

4 Claims, 4 Drawing Sheets

OPTICAL PICKUP GUIDE RAIL POSITIONING MECHANISM

BACKGROUND OF THE INVENTION

1. Field of the Invention

The present invention relates to an optical disk player for reproducing information recorded in an information recording medium, such as an optical disk or a magnetooptic disk, and, more specifically, to an optical pickup guide mechanism for such an optical disk player.

2. Description of the Related Art

FIGS. 5, 6 and 7 show a conventional optical pickup guide mechanism for guiding an optical pickup employed in a conventional optical disk player. Referring to FIG. 5, the optical pickup guide mechanism comprises a guide unit 4 comprising a fixed guide rail 1 fixed at its opposite ends to the fixed members of the optical disk player, a movable guide rail 2, and springs 3 supporting the movable guide rail 2 for movement in directions indicated by arrows A within a predetermined range. As shown in FIG. 6, an optical pickup 5 is supported between the fixed guide rail 1 and the movable guide rail 2 for movement along the fixed guide rail 1 and the movable guide rail 2 in directions indicated by arrows B radial to the center of an optical disk, not shown. The optical pickup 5 is provided with two wheels 6 in rolling contact with the fixed guide rail 1 and one wheel 6 in rolling contact with the movable guide rail 2. The springs 3 bias the movable guide rail 2 toward the optical pickup 5. The movable guide rail remains parallel to the fixed guide rail 1 when the optical pickup 5 is located with the wheel 6 on the side of the movable guide rail 2 on a line O perpendicular to the movable guide rail 2 at the middle point of the same as shown in FIG. 6. However, when the optical pickup 5 is shifted in either direction, for example, downward as viewed in FIG. 7, and the same wheel 6 is dislocated from the line O, the moment of a force produced by one of the springs 3 differs from the moment of a force produced by the other spring 3 and, consequently, the movable guide 2 is tilted at an angle $\theta$ to a reference line parallel to the fixed guide rail 1 as shown in FIG. 7.

The wheels 6 are supported on rolling bearings, not shown, for smooth rotation and, in general, each rolling bearing has a radial clearance between the rolling element and the inner ring or the outer ring and the outer ring has an axial play relative to the inner ring thereof. Accordingly, when the movable guide rail 2 is tilted as shown in FIG. 7, the force acting obliquely to the optical pickup 5 dislocates the wheels 6 from their correct axes of rotation to change the position of the optical pickup 5 relative to the fixed guide rail 1. Furthermore, the force applied to the wheels 6 rolling along the fixed guide rail 1 by the tilted movable guide rail 2 varies with the movement of the optical pickup 5 and, consequently, the power required for moving the optical pickup 5 varies with the position of the optical pickup 5, which causes the optical pickup 5 to slip or rattle.

Such adverse effects of the tilted movable guide rail 2, individually or in combination, affects the performance of the optical pickup 5 adversely.

SUMMARY OF THE INVENTION

Accordingly, it is an object of the present invention to provide an optical pickup guide mechanism for an optical disk player, capable of correctly and stably guiding an optical pickup without entailing adverse effects on the performance of the optical pickup.

In one aspect of the present invention, an optical pickup guide mechanism for guiding the optical pickup of an optical disk player comprises a fixed guide rail, a movable guide rail, a holding mechanism for holding the movable guide rail constantly in parallel to the fixed guide rail, comprising a holding member holding the movable guide rail, a base member, and resilient members joined at their opposite ends to the holding member and the base member so as to bias the movable guide rail held by the holding member toward the fixed guide rail.

BRIEF DESCRIPTION OF THE DRAWINGS

The above and other objects, features and advantages of the present invention will become more apparent from the following description taken in connection with the accompanying drawings, in which:

FIG. 4 is a sectional view taken on line C—C in FIG. 1(a);

DESCRIPTION OF THE PREFERRED EMBODIMENTS

Figure 3:
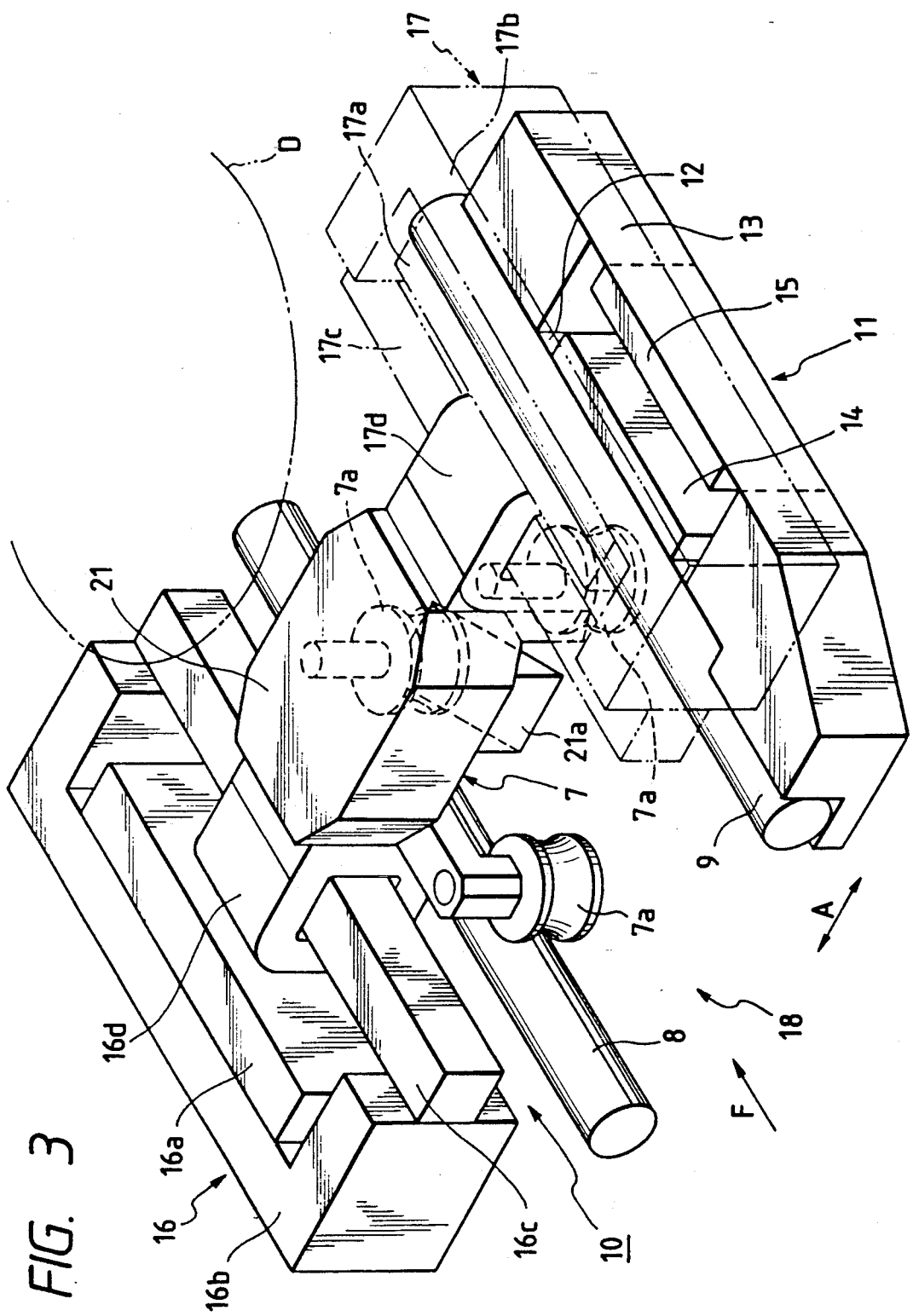
FIG. 3 is a perspective view of an optical pickup guide mechanism in a preferred embodiment according to the present invention as mounted on an optical disk player.

Referring to FIG. 3, an optical pickup guide mechanism 10 is incorporated into an optical disk player to guide an optical pickup 7 for projecting a laser beam on an optical disk D mounted on the optical disk player and to receive the reflected laser beam reflected by the optical disk D. The optical pickup guide mechanism 10 comprises a guide unit 18 for guiding the optical pickup 7 radially to the center of the optical disk D in a plane parallel to the optical disk D, a holding mechanism 11, and linear motors 16 and 17 for moving the optical pickup 7.

The guide unit 18 comprises a fixed guide rail 8 fixed at its opposite ends to a fixed member of the optical disk player, and a movable guide rail 9 supported by the holding mechanism 11 on a fixed member of the optical disk player.

Figure 1A:
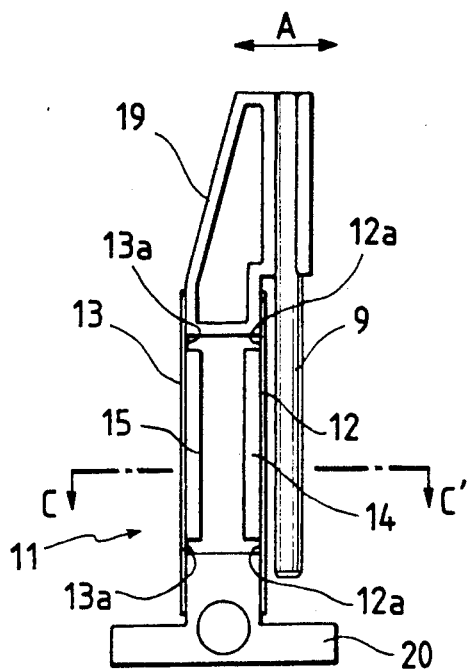
FIGS. 1(a) and 1(b) are a top plan view and a side view, respectively, of a linkage employed in the optical pickup guide mechanism of FIG. 3.
Figure 1B:
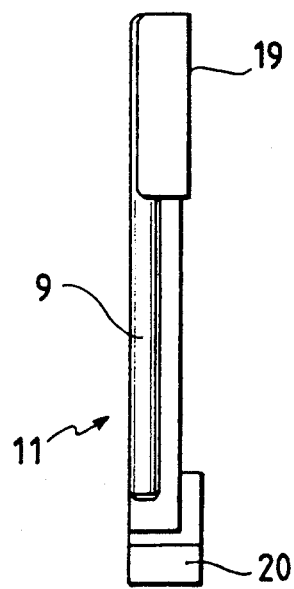
Figure 2:
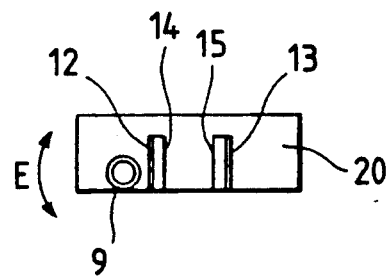

Referring to FIGS. 1(a), 1(b) and 2, the holding mechanism 11 comprises a holding member 19 holding the movable guide rail 9 at one end, a base member 20 attached to a fixed member of the optical disk player, and pressing members 12 and 13 attached at their opposite ends to the holding member 19 and the base member 20 in parallel to each other. The pressing members 12 and 13 are plate springs for biasing the movable guide rail 9 toward the fixed guide rail 8. Stabilizing plates 14 and 15 formed of rigid plates are attached to the middle portions of the pressing members 12 and 13, respectively. Portions 12a of the pressing member 12 near the opposite ends of the same and portions 13a of the pressing member 13 near the opposite ends of the same are left uncovered with the stabilizing plates 14 and 15 to enable the pressing members 12 and 13 to bend in the portions 12a and 13a, respectively. Thus, the holding member 19 is allowed to move only in directions indicated by arrows A. When the movement of the holding member 19 in directions other than those indicated by the arrows A is not a significant problem, the stabilizing plates 14 and 15 may be omitted.

The optical pickup 7 comprises a main body 21 provided in its central portion with an optical system, not shown, including an objective lens through which a laser beam is projected on the optical disk D and a laser beam reflected by the optical disk D is received, two wheels 7a supported on one side of the main body 21 on the side of the fixed guide rail 8 so as to be in rolling contact with the fixed guide rail 8, and a wheel 7a supported on the other side of the main body 21 on the side of the movable guide rail 9 so as to be in rolling contact with the movable guide rail 9.

The linear motor 16 (17) comprises a permanent magnet 16a (17a) having the shape of a rectangular parallelepiped, a yoke 16b (17b) having a shape resembling the letter U in top plan view, a yoke 16c (17c) having the shape of a quadrangular prism and extended across the opposite legs of the yoke 16b (17b), and a tracking solenoid 16d (17d) slidably receiving the yoke 16c (17c) therethrough and attached to the main body 21 of the optical pickup 7. The yokes 16c and 17c are fixed to a fixed member, not shown, of the optical disk player.

The function of the optical pickup guide mechanism thus constructed will be described hereinafter with reference to FIGS. 4(a) and 4(b).

Figure 4A:
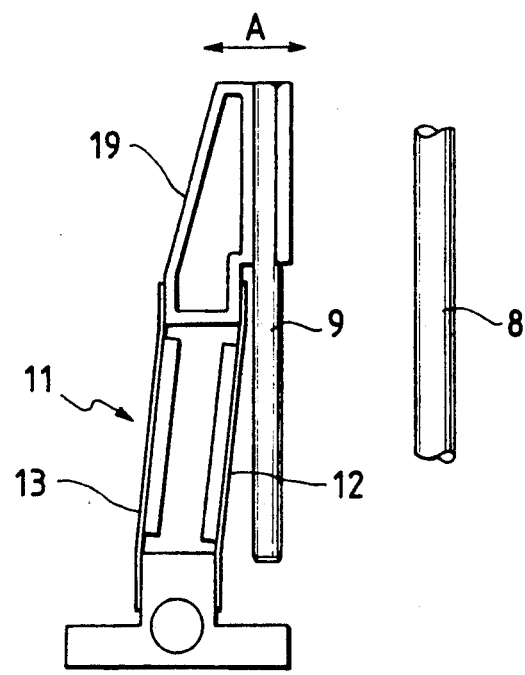
FIGS. 4(a) and 4(b) are views similar to FIGS. 1(a) and 1(b), for assistance in explaining the operation of the linkage.
Figure 4B:
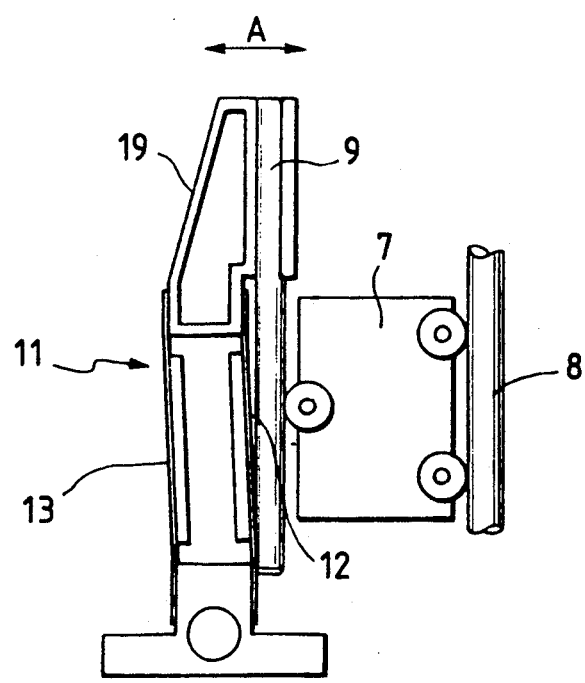
Figure 5:
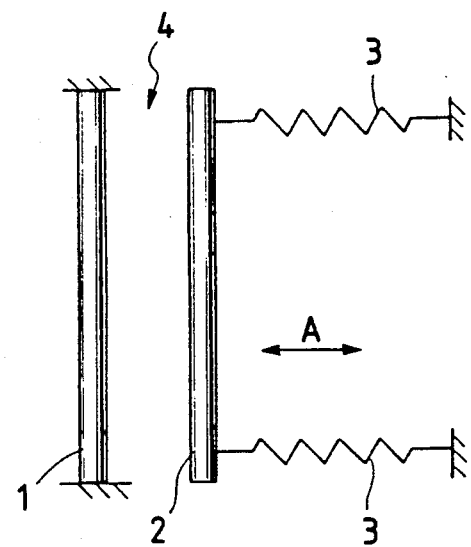
FIGS. 5, 6 and 7 are schematic top plan views of a conventional optical pickup guide mechanism.
Figure 6:
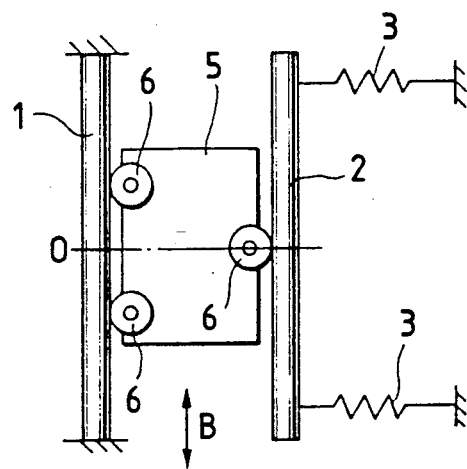
Figure 7:
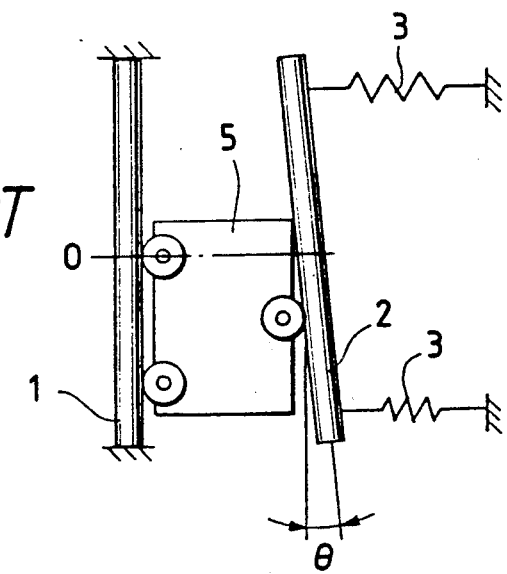

In a free state, the pressing members 12 and 13 of the holding mechanism 11 are bent so that the movable guide rail 9 held by the holding mechanism 11 is biased toward the fixed guide rail 8 as shown in FIG. 4(a). When the optical pickup 7 is disposed between the fixed guide rail 8 and the movable guide rail 9 with the wheels 7a in rolling contact with the fixed guide rail 8 and the movable guide rail 9, respectively, the pressing members 12 and 13 are bent resiliently in the opposite direction in shapes as shown in FIG. 4(b) to translate the holding member 19 in the direction indicated by the arrow A, so that the optical pickup 7 is held between the fixed guide rail 8 and the movable guide rail 9 in a correct position. Thus, the holding mechanism 11 holds the movable guide rail 9 constantly in parallel to the fixed guide rail 8 regardless of the position of the optical pickup 7 relative to the guide rails 8 and 9 and, consequently, the optical pickup 7 is never urged obliquely with respect to the guide rails 8 and 9, and hence the optical pickup 7 is maintained in a fixed position with respect to the fixed guide rail 8. Accordingly, optical pickup 7 can be moved smoothly along the guide rails 8 and 9 without slipping or rattling, so that the optical pickup 7 is able to function satisfactorily regardless of its position relative to the fixed guide rail 8.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An optical pickup guide mechanism for guiding an optical pickup of an optical disk player radially to the center of an optical disk loaded in the optical disk player in a plane parallel to the optical disk, said optical pickup guide mechanism comprising:
   a fixed guide rail fixedly supported on a fixed member of the optical disk player;
   a movable guide rail having a first end and a second end disposed opposite to the fixed guide rail to support and guide the optical pickup in cooperation with the fixed guide rail, said movable guide rail being movable toward or away from the fixed guide rail; and
   a holding mechanism for holding the movable guide rail constantly in parallel to the fixed guide rail regardless of the position of the optical pickup relative to the fixed guide rail and the movable guide rail, said holding member comprising:
      a holding member fixedly connected to the movable guide rail only at a point adjacent the first end and holding the movable guide rail in parallel to the fixed guide rail;
      a base member fixed to the fixed member of the optical disk player; and
      a pair of resilient members joined at their opposite ends to the holding member and the base member so as to extend always in parallel to each other and so as to bias the movable guide rail held by the holding member resiliently toward the fixed guide rail so that the movable guide rail can be translated relative to the fixed guide rail.

2. An optical pickup guide mechanism according to claim 1, wherein said resilient members are plate springs, and the middle portions of the plate springs extending between the holding member and the base member except small portions contiguous with the holding members and the base members are reinforced by rigid strips, respectively, so that only those small portions of the plate springs contiguous with the holding member and the base member, respectively, are bendable.

3. An optical pickup guide rail positioning mechanism for positioning a movable guide rail of an optical disk player, the movable guide rail having a first end and a second end and being disposed parallel to a fixed guide rail, the positioning mechanism comprising:
   a base member fixedly mounted to the optical disk player;
   a pair of resilient elongated members having first and second ends, said pair of resilient elongated members fixedly disposed at the first ends to said base, said pair of resilient members being substantially parallel; and
   a rail holding member fixedly disposed to the second ends of said pair of resilient elongated members, said movable guide rail being fixedly connected to said rail holding member only at a point adjacent the first end of said movable guide rail.

4. An optical pickup guide mechanism according to claim 3, wherein said resilient elongated members are plate springs, and the middle portions of the plate springs extending between the rail holding member and the base member except small portions contiguous with the holding members and the base members are reinforced by rigid strips, respectively, so that only those small portions of the plate springs contiguous with the holding member and the base member, respectively, are bendable.

* * * * *